(12) United States Patent
Miyajima et al.

(10) Patent No.: US 6,518,958 B1
(45) Date of Patent: Feb. 11, 2003

(54) ELECTRONIC APPARATUS HAVING PLURAL ENTRY SWITCHES

(75) Inventors: Akio Miyajima, Osaka (JP); Tamotsu Yamamoto, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 139 days.

(21) Appl. No.: 09/654,508

(22) Filed: Sep. 1, 2000

(30) Foreign Application Priority Data

Sep. 1, 1999 (JP) .................................. 11-247498

(51) Int. Cl.$^7$ ................................................ G09G 5/00
(52) U.S. Cl. ................................. 345/173; 178/18.03
(58) Field of Search ............................... 345/169, 158, 345/157, 156, 168, 173, 179, 182, 901, 902; 178/18.03, 18.05, 18.07, 18.09; 341/22, 23

(56) References Cited

U.S. PATENT DOCUMENTS

| | | | |
|---|---|---|---|
| 5,646,649 A | * 7/1997 | Iwata et al. ............... | 345/169 |
| 5,742,894 A | 4/1998 | Jambheckar et al. | |
| 5,844,506 A | 12/1998 | Binstead | |
| 5,909,211 A | 6/1999 | Combs et al. | |
| 5,917,906 A | 6/1999 | Thornton | |
| 5,956,021 A | 9/1999 | Kubota et al. | |
| 5,996,080 A | * 11/1999 | Silva et al. ............... | 345/169 |
| 6,243,080 B1 | * 6/2001 | Molne ...................... | 345/157 |

* cited by examiner

*Primary Examiner*—Chanh Nguyen
(74) *Attorney, Agent, or Firm*—Wenderoth, Lind & Ponack, L.L.P.

(57) ABSTRACT

In an electronic apparatus having a membrane switch and a touch panel switch at its entirety section, the touch panel switch is elastic and is laid over the membrane switch. The two-layered structure provides users with two operations: a "finger-sliding" operation and a "finger-depressing operation." When a user slides a finger on the surface of the touch panel switch, the sliding force activates the touch panel switch. The "finger-sliding" is used for selecting a desired item. On the other hand, when the user presses down on the surface of the touch panel switch, the depression force through the touch panel switch activates the underlying membrane switch. The "finger-depressing" is used for numeric or symbolic information entry. It is thus possible to realize an electronic apparatus offering an excellent compromise between ease of operation and a wide display section.

20 Claims, 15 Drawing Sheets

ELECTRONIC APPARATUS HAVING PLURAL ENTRY SWITCHES

FIELD OF THE INVENTION

The present invention relates to an electronic apparatus, such as a video camera, an audio device or a mobile phone, having a plurality of entry switches arranged at its operating section.

BACKGROUND OF THE INVENTION

With advances in digital techniques, consumer-oriented electronic products including mobile phones, video cameras and audio devices have been highly integrated, and endowed with high performance in their downsized bodies. Besides, the-state-of-the-art has also accelerated an improvement in the user interface including a display and a keyboard. Here, taking a mobile phone as an example of such conventional consumer-oriented electronic products, its structure and operating characteristics are described below.

First of all, the structure of a mobile phone is described with reference to the accompanying drawings. FIG. 11 is a front view of a conventional mobile phone. On the front side of outer housing 1, the sections, from top to bottom in the figure, arranged are:

(a) receiver 2 made of a loudspeaker;
(b) display 3 made of a LCD (liquid crystal display);
(c) touch panel switch 7;
(d) entry buttons made of numeric keys and confirmation keys;
(e) transmitter 5 made of a microphone.

FIG. 12 and FIG. 13 illustrate a cross-sectional view and an exploded perspective view of touch panel switch 7, respectively. As shown in the figures, conductive films 12 and 13, which are formed at face-to-face surfaces of touch panel switch 7, are sandwiched between two properly shaped insulating pads 10 and 11. Between conductive films 12 and 13, adhesive spacer 30 is inserted, maintaining an interval in order to provide electrical insulation. Insulating pad 10 is formed to be elastic. When a user's finger depresses or slides on the pad, the applied force recesses a position and leads to electrical conduction between conductive films 12 and 13. Each time condition is established, an output signal is obtained from electrode portion 14 via lead portions 15A to 15D and 16. The structure adopted for touch panel switch 7 is generally called an analog type or a resistive film type.

As shown in FIG. 11, outer housing 1 accommodates extendible antenna 17 at its top. Display 3, touch panel switch 7, entry buttons 6, and electric circuitry (not shown) which controls antenna 17, are housed in outer housing 1. The structure including the electric circuitry is shown in the block diagram in FIG. 14.

In FIG. 14, Central Processing Unit (CPU) 18 performs various calculations and evaluations. More specifically, CPU 18 controls display 3 through Liquid Crystal Display (LCD) driver 19 and processes directly received signals from entry buttons 6; CPU 18 processes output signals from touch panel switch 7 via touch panel switch driver 20; CPU 18 controls antenna 17 via transmission-reception circuit 21; and CPU 18 also controls ROM 22 having pre-stored information, and RAM 23 in which the information items of a telephone directory can be added or deleted as required.

The placing-a-call procedure is now described. Suppose that the phone number of a party to be called is selected by a search function from the phone numbers pre-stored in a memory in the mobile phone. When the mobile phone is not in communication, as shown in FIG. 15, display 3 displays initial menu 24 comprising a plurality of items, and cursor 25 identifies distinctively which item is concurrently selected in the menu.

In order to place a call with the search function, a user usually selects the "Calling telephone number" item in the initial menu. With the finger-sliding motion on the surface of touch panel switch 7, the user can put cursor 25 in display 3 on the "Calling telephone number" item. When the user slides the finger on the surface of elastic insulating pad 10, a contact point between conductive films 12 and 13 changes its position, following the wake of the finger-sliding motion. Referring to now FIG. 13, lead portion 15 (15A through 15D) is extended from electrode portion 14 (14A through 14D). Lead portion 16 is electrically connected to conductive film 12 with contact portion 16A, which is laid beneath insulating pad 10. In response to the position changed by the finger motion on the surface, touch panel switch 7 produces an output signal (i.e., an output voltage value) with its magnitude varying between lead portions 15 and 16. Obtained from two orthogonal directions, the output signal is converted from analog to digital by touch panel switch driver 20. Then the converted signal is entered into CPU 18. Processing the received signal in time sequence, CPU 18 determines in which direction the finger slid on the touch pad surface of touch panel switch 7, and moves cursor 25 in a proper direction based on the determination.

With the cursor sitting on the desired item, the user depresses confirmation key 6A. Through this action, a decision signal is sent to CPU 18. The decision signal informs CPU 18 of completion of selecting and confirming the desired item. Receiving the decision signal, CPU 18 recognizes that the "Calling telephone number" item is selected, and fetches the pre-stored telephone directory information from RAM 23 or ROM 22. CPU 18 then sends the information to LCD 4 via LCD driver 19, so that the telephone directory appears on the display 3.

With another finger-sliding motion on the touch pad surface of touch panel switch 7, the user now moves cursor 25 to identify a telephone number to be selected, then depresses confirmation key 6A. In response to this action, CPU 18 recognizes that the selection is validated and performs the predetermined procedure: CPU 18 not only transmits a transmission signal through transmission-reception circuit 21 and antenna 17 to the selected phone number of the party to be called, but also activates receiver 2 and transmitter 5.

As described above, the finger-sliding motion on the touch panel surface of touch panel switch 7 is a quick-and-easy manner of selection in conventional mobile phones. The users can thereby pick out the desired item easily among many items on the display.

The ease of use mentioned above; however, is impaired on a smaller touch panel: the area requires enough space for the finger-sliding motion. Due to recent technological advances, electronic apparatus are getting smaller and smaller. On the other hand, the display area of such apparatus requires more space to cope with a higher volume of information to display thereon. In turn, it has become difficult to reserve enough space for a touch pad in a limited space.

SUMMARY OF THE INVENTION

The present invention addresses the problems discussed above and aims to provide an electronic apparatus without any space occupied exclusively by the touch panel switch on its entry section. It is a further object to provide an electronic appartus that offers an improved finger-sliding operation with positive response to the touch panel switch.

In the structure of the entry section of an electronic apparatus according to the present invention, a touch panel switch with elasticity is placed over a depression switch with tactile feedback (similar to a clicking response.) The depression switch comprises a plurality of switch elements disposed in a planar arrangement. When a user slides the finger on the surface of the touch panel switch structured above, an output signal from the touch panel switch changes in response to the finger-sliding operation. From the output changes, the apparatus detects in which direction the finger moves and how far the finger moves on the touch panel. The detected moving direction and amount are associated with the items appearing on the display, so that the user can select a desired item and then enter it.

This two-layered structure thus offers a user-friendly electronic apparatus having two ways of operation: finger-sliding with a light touch enables the user to select a desired item; and finger-depressing with a force sufficient to activate the lower-layered depression switch enables the user to enter preset information including characters, numerals, and symbols.

According to the present invention, the apparatus comprises a display section displaying a plurality of items and identifying an item to be selected from among the items, and a depression switch with tactile feedback. The depression switch is made up a plurality of switch elements, and different information for data entry is assigned to each of them.

An elastic touch panel switch is laid over the depression switch with tactile feedback. Due to the elasticity, the force applied on the surface of the touch panel switch can also operate the lower-layered depression switch. When a user now slides the finger on the upper-layered touch panel switch, an output signal from the touch panel switch changes in response to the finger-sliding operation. From the output changes, the apparatus detects which direction the finger moves and how far the finger moves on the touch panel. The detected moving direction and amount are associated with the items appearing on the display, so that the user can select a desired item and then enter it. This two-layered structure not only eliminates the space allocated for a touch panel switch from the entry section, but also maintains enough area for easily performing the finger-sliding operation, it is thus possible to provide an electronic apparatus with ease of operation.

In a preferred embodiment, a plurality of entry buttons may be arranged between the outer housing and the top surface of the touch panel switch. As the user's finger slides along the face of the arranged buttons, the bottom of the button depresses a specified position of the touch panel switch. That is, a staircase-shaped signal is obtained from the touch panel switch, which is reliable, easy to detect and control.

As another preferred embodiment, a transparent material may be employed for the touch panel switch and the entry buttons disposed thereon, and an illuminator may be disposed beneath the touch panel switch. The illuminator makes the surface of the touch panel switch glow for increased visibility, when the user operates the apparatus in the dark.

In still another preferred embodiment of the present invention, the apparatus comprises a display section displaying a plurality of items and identifying an item to be selected from among the items, and an elastic membrane switch with tactile feedback. The membrane switch is made up of a plurality of switch elements, and different information for data entry is assigned to each of them.

The membrane switch is laid over the touch panel switch. As a user slides the finger horizontally along the surface of the membrane switch, an output from the touch panel switch changes in response to the finger-sliding operation. From the output changes, the apparatus detects in which direction the finger moves and how far the finger moves on the membrane switch. The detected moving direction and amount are associated with the items appearing on the display, so that the user can select a desired item and then enter it. This two-layered structure thus not only eliminates the space allocated for a touch panel switch from the entity section, but also maintains enough area for easily performing the finger-sliding operation. It is thus possible to provide an electronic apparatus with ease of operation. In addition, a plurality of entry buttons may be disposed between the membrane switch and the outer housing laid thereon. This structure secures a positive depression on the membrane switch, providing users with a tactile response.

DESCRIPTION OF THE PREFERRED EMBODIMENTS

The preferred embodiments of the present invention are described hereinafter with reference to the accompanying drawings, FIG. 1 through FIG. 10.

First Preferred Embodiment

Figure 1:
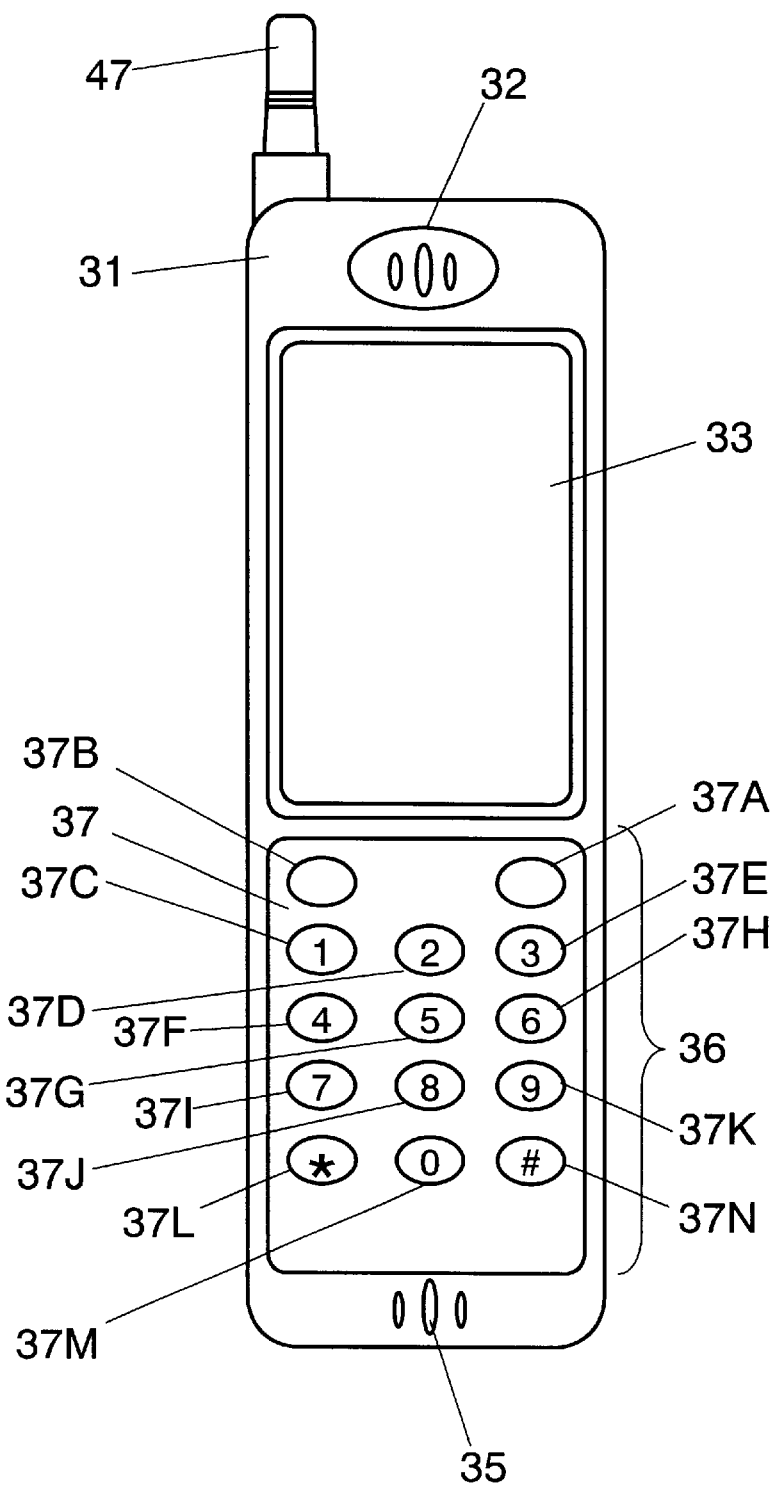
FIG. 1 shows a front view of a mobile phone in accordance with a first preferred embodiment of the present invention.
Figure 2:
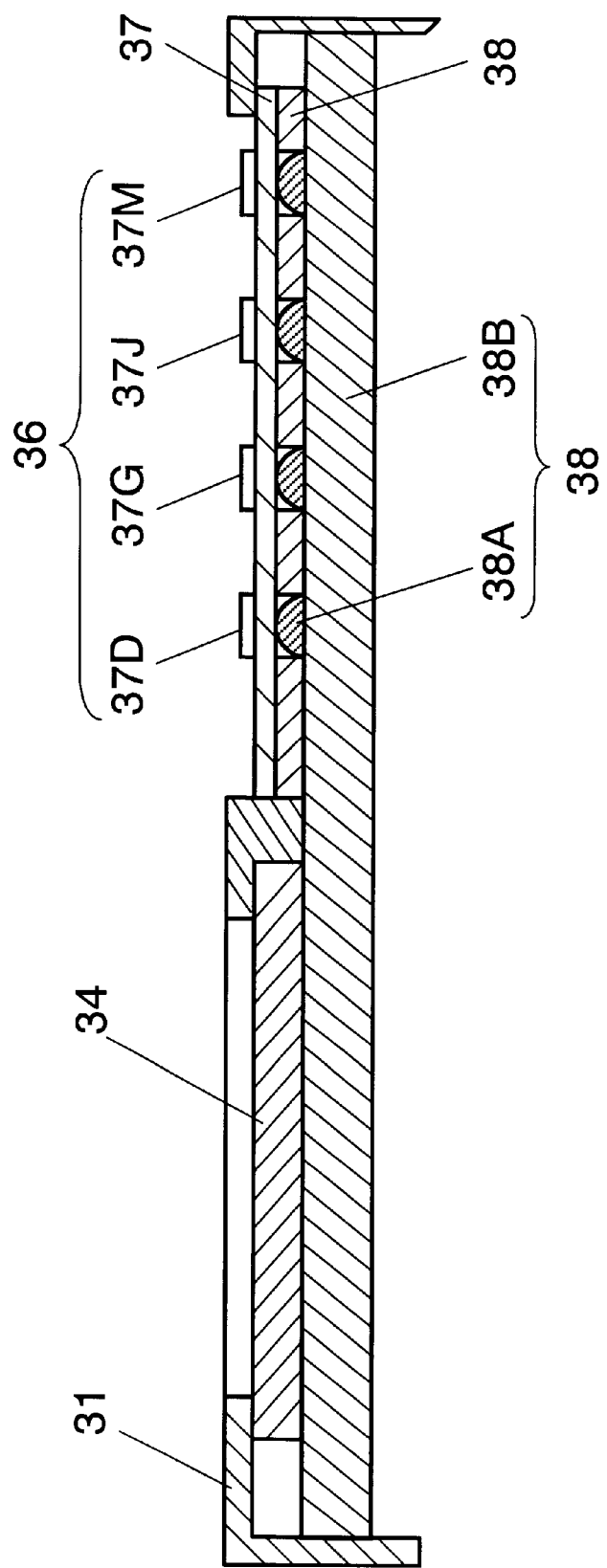
FIG. 2 shows a side cross-sectional view of the mobile phone.
Figure 3:
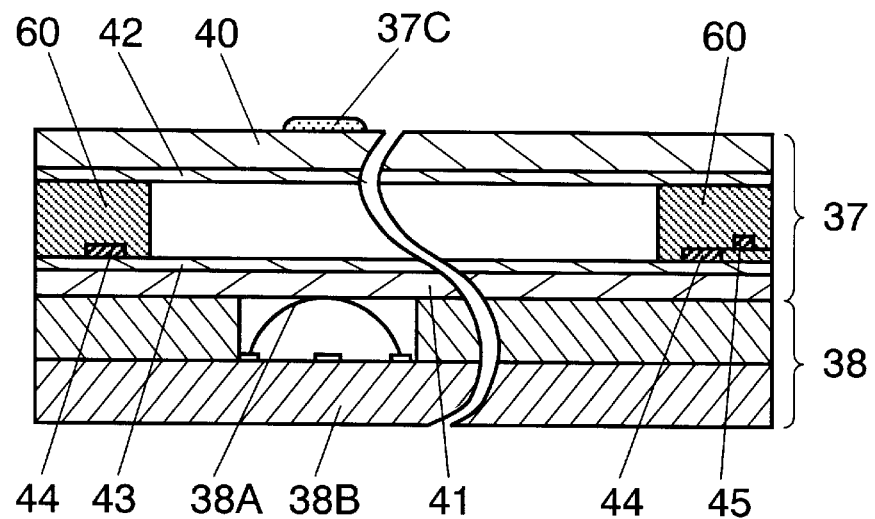
FIG. 3 shows a partial enlarged cross-sectional view of a touch panel switch and a membrane switch, which are the essential parts of the mobile phone.

FIG. 1 shows a front view of a mobile phone in accordance with a first preferred embodiment of the present invention. In FIG. 1, outer housing 31 has a touch panel surface on its front, and is also an enclosure for accommodating electric circuitry therein. Above the touch panel surface, receiver 32 and display 33 formed by an LCD 34 are disposed, and disposed below the touch panel surface is transmitter 35. FIG. 2 and FIG. 3 show a cross-sectional view and a partial enlarged cross-sectional view, respectively. Entry section 36 is responsible for entry and selection when the mobile phone is in operation. As shown in FIGS. 2 and 3, touch panel switch 37 formed to be elastic is arranged at the top surface of the entry section 36, and membrane switch with tactile feedback 38 is laid beneath the touch panel switch 37. On the entry section side of the touch panel switch 37, as shown in FIG. 1, button markings 37A to 37N are arranged at positions which correspond to each switch element of the membrane switch 38. Markings 37A to 37N indicate each position and function of each switch element.

When a user depresses some positions of the markings for numerical or symbol data entry, thanks to the two-layered structure described above, the depression at each position activates the corresponding switch element of the membrane switch 38. For example, when the user depresses marking 37C marked "1" (FIG. 1), the depression recesses, as shown in FIG. 3, the part beneath marking 37C in the elastic touch panel switch 37, and further the force is transmitted through the touch panel switch 37 to conductive diaphragm 38A. If the depression force is beyond a predetermined value, conductive diaphragm 38A flips its shape vertically, thereby conducting the switch circuit having diaphragm 38A, which is formed on printed circuit board 38B. In this way, the numerical value "1" is accepted as the entry data. For good tactile response and operability, the depression force, i.e., a repulsive force required to flip diaphragm 38A is preferably set to approximately 100-gram force (gf).

Figure 4:
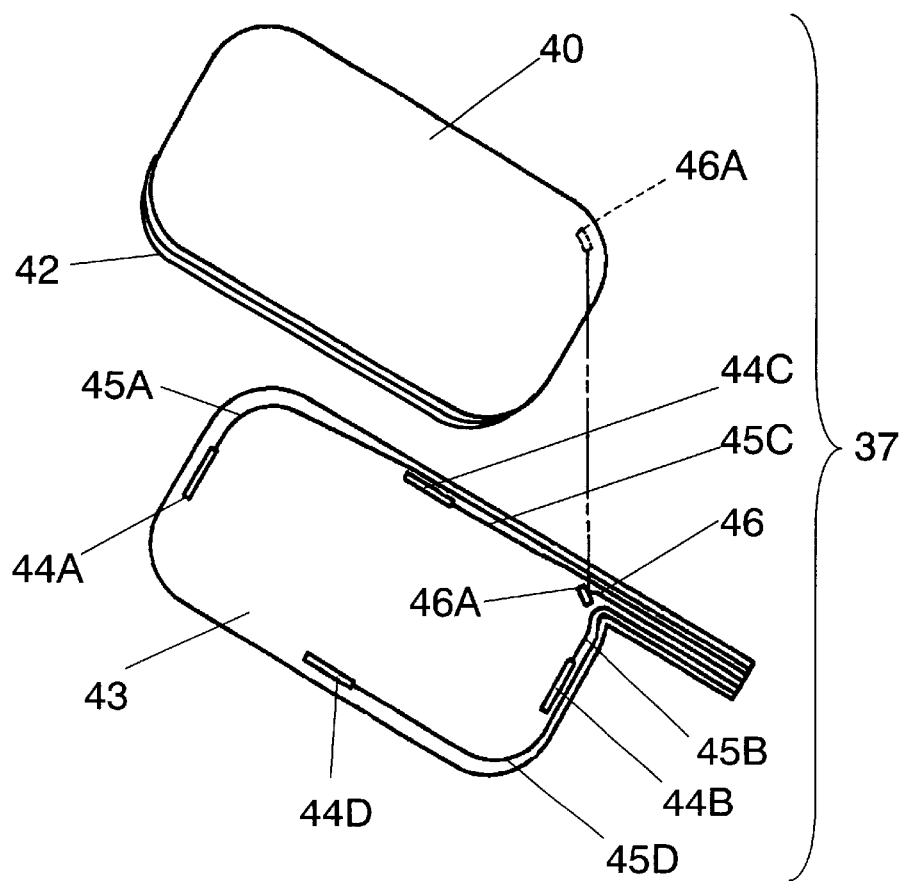
FIG. 4 shows an exploded perspective view of the touch panel switch, which is essential part of the mobile phone.

Touch panel switch 37 is generally called an analog type or a resistive film type. FIGS. 3 and 4 illustrate a partial cross-sectional view and an exploded perspective view of touch panel switch 37, respectively. Conductive films 42 and 43 are formed on face-to-face sides of rectangular insulating pads 40 and 41, respectively. Adhesive spacer 60 is inserted between conductive films 42 and 43 to maintain an interval for electric insulation. This structure is the same as that in the prior art, with the exception that insulating pads 40, 41 and conductive films 42, 43 are all elastic.

On the periphery of conductive film 43 placed over insulating pad 41, four electrode portions 44 (44A through 44D) are disposed in the middle of each edge. Each electrode portion is sided shorter than the edges of the conductive film, and arranged in an orthogonal orientation relative to each other. Lead portions 45 (45A through 45D) are connected to each of electrode portions 44 (44A through 44D), respectively. Lead portions 46 are electrically connected to conductive film 42 laid beneath insulating pad 40 with contact portion 46A. As shown in FIG. 4, lead portions 45 and 46 are both extended out from touch panel switch 37.

In addition, touch panel switch 37 is arranged within outer housing 31 such that electrode potions 44A through 44D are placed in parallel with each edge of the touch pad surface and, the area surrounded by the four electrode portions 44A through 44D works as the touch pad surface.

In order to obtain an output signal, touch panel switch 37 works in the same manner as does the conventional type: the finger-sliding operation with a depression force on the surface of insulating pad 40 leads to electrical conduction between conductive films 42 and 43. Touch panel switch 37 is adjusted so as to produce a predetermined output signal when a depression force of approximately 10 gf is applied.

According to the touch panel surface as described above, in which touch panel switch 37 is correctly associated with each element of membrane switch 38, and the depression force is adjusted to a predetermined value, when a relatively small depression force of approximately 10 gf is exerted on the surface of switch 37 by the finger-sliding operation, an output signal corresponding to the force can be obtained easily. On the other hand, when a positive downward depression force, for example, approximately 100 gf, is applied to one of markings 37A through 37N on touch panel switch 37, the switch 37 can transmit the force, due to its elasticity, to membrane switch 38. As a result, an output signal associated with the depressed marking position is now easily obtained.

In response to the depression force of 100 gf, touch panel switch 37 also reacts and produces an output signal. For avoiding a malfunction, it is preferable to employ a software-controlled evaluation such that any output signal from switch 37 is ignored when membrane switch 38 produces an output signal.

Referring now to FIG. 1, accommodating expandable antenna 47 at its top, outer housing 31 is the enclosure for display 33, touch panel switch 37, membrane switch 38, and electric circuitry (not shown in FIGS. 1 and 2) for controlling antenna 47.

Figure 5:
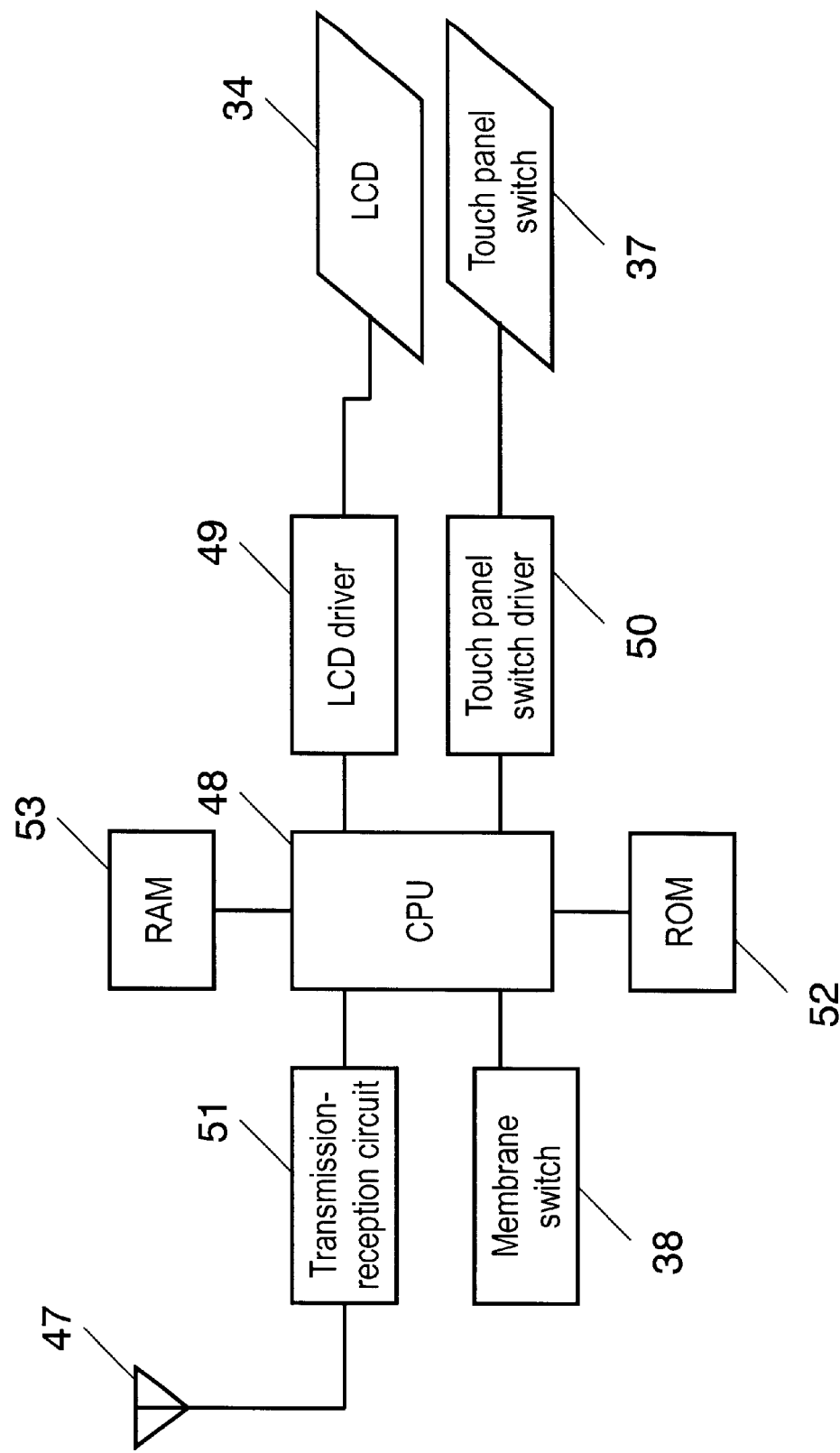
FIG. 5 shows a block diagram of the mobile phone.

The structure including the electric circuitry of the mobile phone according to the preferred embodiment of the present invention is briefly described below. CPU 48, as shown in FIG. 5, executes a various kind of calculation and evaluation. As is similar to conventional structure, display 33, touch panel switch 37, membrane switch 38, and antenna 47 are coupled directly or via specific circuits to CPU 48: display 33, touch panel switch 37 and antenna 47 are coupled to CPU 48 via LCD driver 49, touch panel switch driver 50 and transmission-reception circuit 51, respectively, while membrane switch 38 is directly connected to CPU 48. CPU 48 also controls ROM 52 and RAM 53, ROM 52 holds pre-stored specific information therein, and RAM 53 allows users to add/delete telephone directory information as required.

Figure 6:
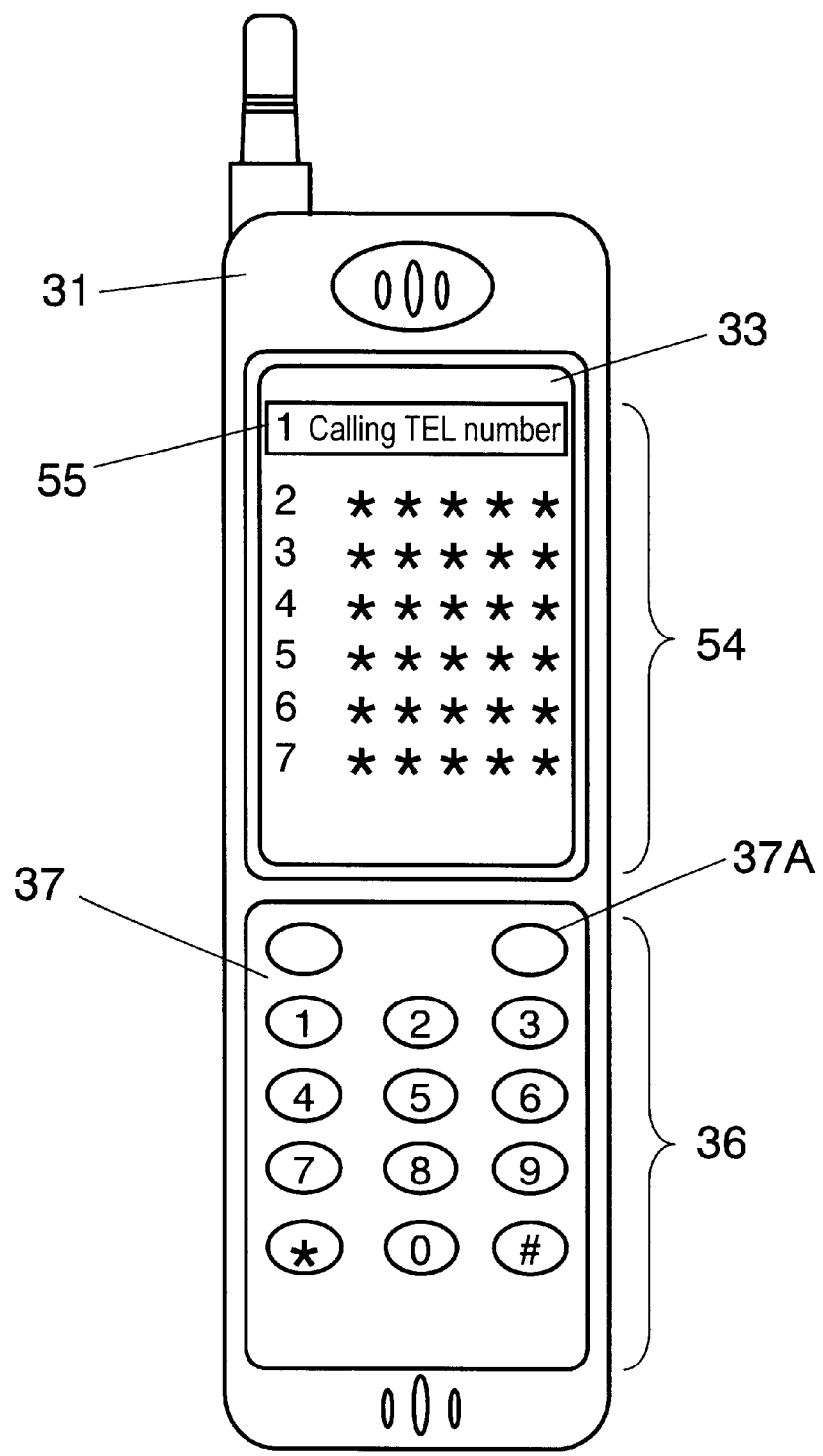
FIG. 6 shows a front view of the display section of the mobile phone before operation.

Now described are about the operating principles of the mobile phone according to the preferred embodiment. FIG. 6 illustrates a mobile phone which is not in communication. Display 33, like the display in the prior art, displays initial menu 54 comprising a plurality of items, and cursor 55 that highlights a currently selected item from among the items appearing on the display. In the conventional display, however, the structural limitation that an area for the touch panel has to be allocated between the display and the entry section inevitably "eats" the area for the display. When selecting a desired item from the initial menu with long lists, a user inconveniently scrolls hidden items to view. As opposed to the conventional design with such inconvenience, according to the embodiment, the structure in which touch panel switch 37 is laid over membrane switch 38 in FIG. 3 realizes a large display 33. Thanks to the two-layered structure, display 33 can display several lines of information items more than the conventional display.

Here will be discussed how to place a call. In order to select a desired function from the initial menu, with the finger-sliding operation on the surface of touch panel switch 37, a user moves cursor 55 on display 33 toward a desired item. The depression force by the finger-sliding operation is relatively small, approximately 10 gf. In response to the force touch panel switch 37 works as follows. Touch panel switch 37 comprises, as mentioned earlier, insulating pads 40, 41, and conductive films 42, 43. Conductive films 42 and 43 are formed on the facing surfaces of insulating pads 40 and 41, respectively. Two insulating pads are placed at a predetermined interval for electrical insulation. When the user slides the finger on the top surface of insulating pad 40, a contact point between conductive films 42 and 43 changes its position, following the wake of the finger-sliding motion. According to the positional changes, an output signal obtained through electrode portions 44A to 44D and lead portions 45A to 45D, 46 (i.e., an output voltage value) also varies. The output voltage value is detected from the signals having two orthogonal directions, that is, from the signals occurred between electrode portions 44A and 44B, and from the signals occurring between electrode portions 44C and 44D.

Now will be discussed in a little more detail how to obtain the output voltage value from touch panel switch 37. On conductive film 43, as shown in FIG. 4, two pairs of electrode portions are arranged in orthogonal orientation. Now, between one pair of electrode portions, 44A and 44B (that is, between lead portions 45A and 45B) and, between the other pair of electrode portions, 44C and 44D (that is, between lead portions 45C and 45D), a voltage is applied alternately, so that conductive film 43 is energized. The depression force applied to elastic insulating pad 40 recesses conductive film 42, making a contact point with energized conductive film 43. At the same time, an output voltage value is obtained between lead portions 45A (45B) and 46, or between lead portions 45C (45D) and 46. Touch panel switch driver 50 shown in FIG. 5 converts the obtained output signal from analog to digital, and sends it to CPU 48. Processing the received signal in time sequence, CPU 48 determines in which direction the finger slides, and how fast the finger moves on the surface of touch panel switch 37, to thereby move cursor 55 shown in FIG. 6 according to the direction and speed.

With cursor 55 highlighting a desired item, the user depresses marking 37A downwardly with a depression force of approximately 100 gf. The depression on marking 37A, which validates the selection, activates a corresponding switch element of membrane switch 38, so that a decision signal for the selected item is sent to CPU 48. Receiving the decision signal, CPU 48 recognizes the item highlighted by cursor 55 on display 33 in FIG. 6. CPU 48 then invokes the corresponding menu data from ROM 52 or RAM 53 and transmits the menu data through LCD driver 49 to display 33. As a result, the user views the desired menu called up on display 33.

Figure 7:
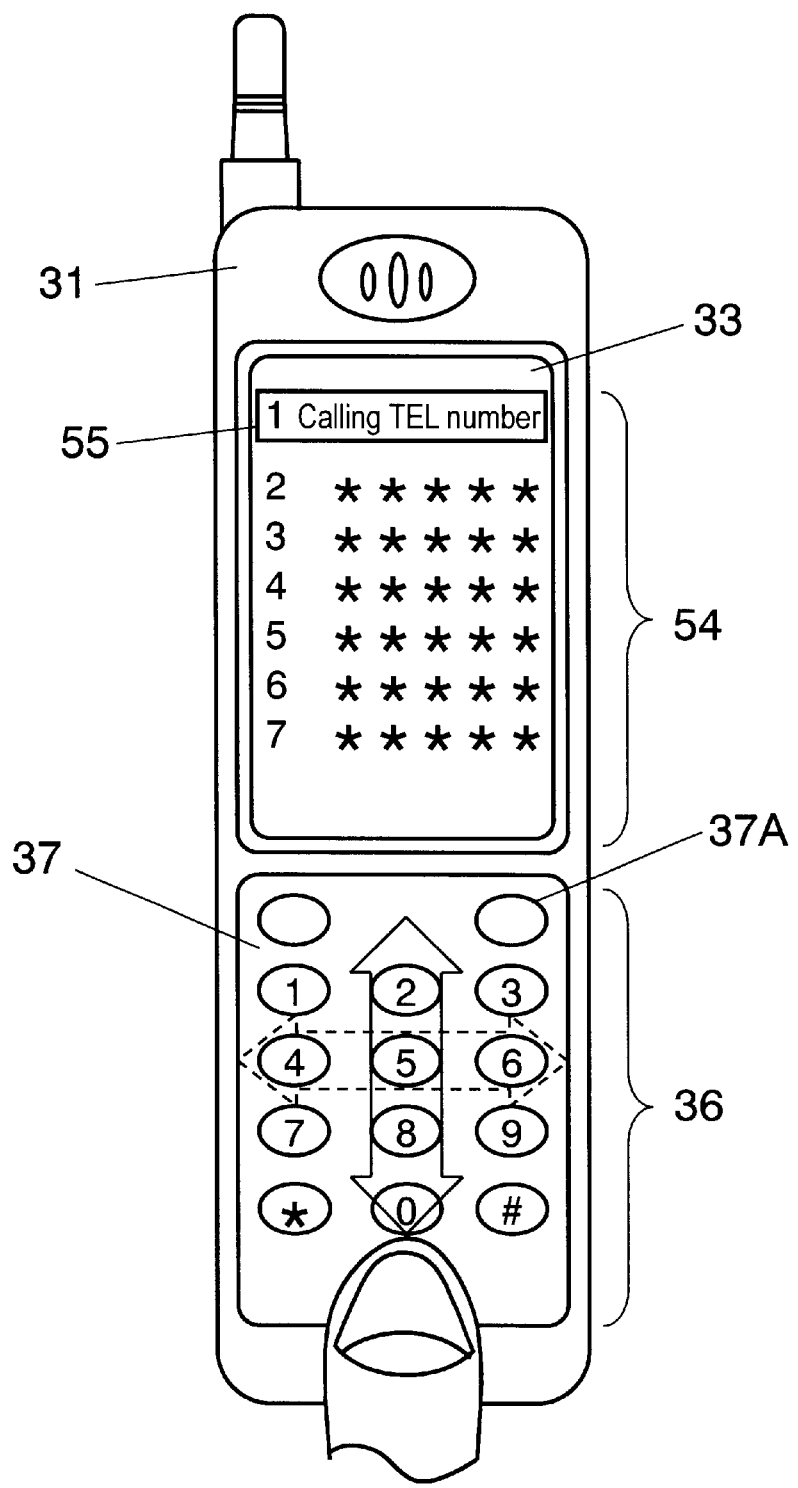
FIG. 7 shows a front view of the display section of the mobile phone during operation.

The mechanism will be explained in some detail, taking a case in which the phone number of a party to be called is searched from pre-stored information as an example. First of all, a user selects the "Calling telephone number" item from the initial menu 54. For this selection, as shown in FIG. 7, with the finger-sliding motion in up-to-bottom direction on touch panel switch 37, the user moves cursor 55 appearing on display 33 to the "Calling telephone number" item. With "Calling telephone number" being highlighted, the user depresses marking 37A for validating the selection. In response to this operation, CPU 48 invokes telephone directory information that is pre-stored in ROM 52 or RAM 53, and sends the information through LCD driver 49 to display 33. Then, with another finger-sliding motion on touch panel switch 37, the user moves cursor 55 to a desired phone number and depresses marking 37A for validating the selection. Receiving this decision signal, CPU 48 recognizes the selection of the desired phone number and performs the predetermined procedures: CPU 48 transmits a transmission signal through transmission-reception circuit 51 and antenna 47 to the selected and validated phone number of the party to be called, and enables receiver 32 and transmitter 35 as well.

In order to place a call, a user may enter a series of numerals indicating a phone number through membrane switch 38 shown in FIG. 2. In this case, an output signal from touch panel switch 37 can be detected, as well as from membrane switch 38. CPU 48 can cope successfully with the situation, executing pre-programmed software, in which any output signal from switch 37 is ignored when membrane switch 38 produces an output signal.

According to the embodiment, touch panel switch 37 is placed over membrane switch 38 for numerals and symbols entry. The two-layered structure not only enables the use of an area-limited touch pad surface to be maximized, but also reserves the area of display 33 to be broader. Display 33 can therefore display can additional 3–4 lines of information items as compared with the conventional display. With this structural improvement, it is possible to provide a user-friendly mobile phone with good visual recognition. In addition, on the wide area of touch panel switch 37, changes of an output voltage can be "magnified" to be read. In other words, a fine-adjusted control becomes possible. It is possible to control a moving speed of the operation, as well as a moving direction.

In selecting-item operation, the moving direction of cursor 55 is not limited to top-to-bottom: in response to the finger-sliding operation in side-to-side or diagonal direction on the touch pad surface of touch panel switch 37, it is possible to control cursor 55 to follow this direction.

As an application for the embodiment, in selecting-item operation, it is possible to make the items move, with the cursor sitting on a position, instead of moving the cursor onto desired item.

Touch panel switch 37 is not limited to the type described above. As an application of the embodiment, it is effective to employ, for example, a digital type touch panel switch. In this case, an ON-state output signal is produced, following the wake of the finger-sliding operation. The CPU can detect a series of ON-state signals for the evaluation. A static capacitance type touch panel is also available with effect. As another application of the embodiment, the touch panel switch may be made of a transparent material, and an illuminator, such as an electroluminescent (EL) element of a light-emitting diode (LED), may be arranged at the bottom of the touch panel switch. With the help of the illuminator, the user can easily operate the switch even in the dark. As still another application of the embodiment, a normal type switch such as a depression switch with tactile feedback may be employed, instead of using membrane switch 38. In addition, the depression force applied to touch panel switch 37 and membrane switch 38 is not limited to the value mentioned earlier. It may be adjusted to an appropriate value if necessary.

Second Preferred Embodiment

Figure 8:
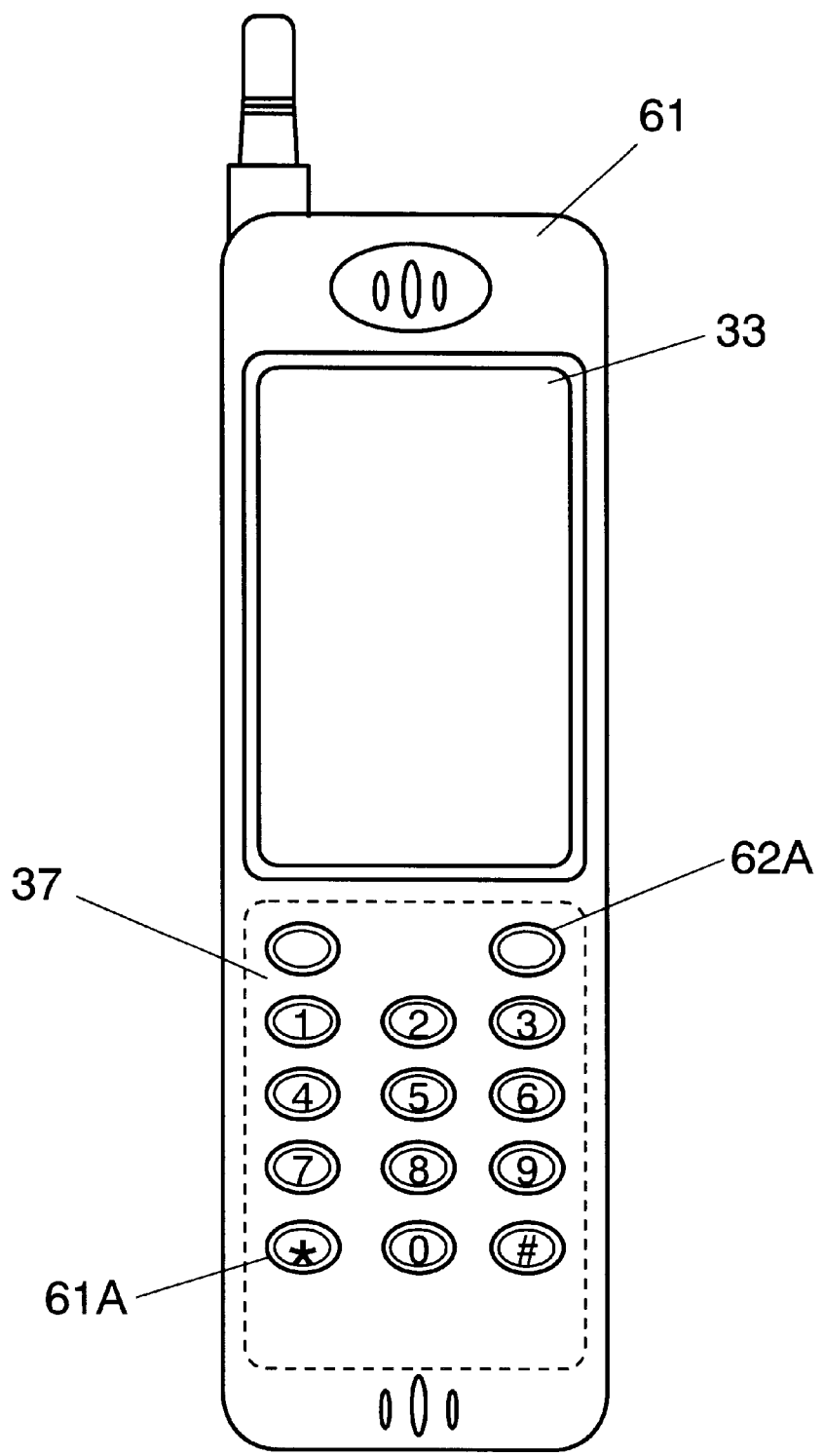
FIG. 8 shows a front view of a mobile phone in accordance with a second preferred embodiment of the present invention.
Figure 9:
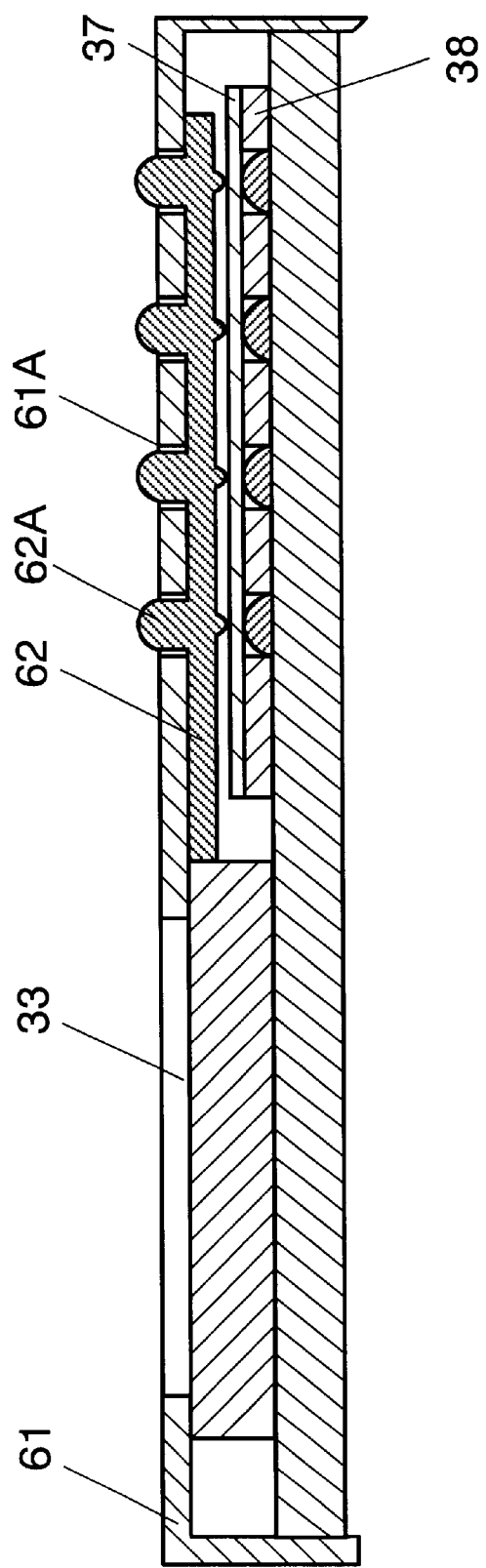
FIG. 9 shows a side cross-sectional view of the mobile phone.

FIG. 8 is a front view, and FIG. 9 is a cross-sectional view of a mobile phone in accordance with a second preferred embodiment of the present invention. As illustrated in FIG. 9, the difference between the structures shown in the first and second embodiments is in the arrangement of entry button member 62, which is inserted between touch panel switch 37 and outer housing 61. The rest of the configuration is the same as that in the first preferred embodiment, and hence the description is omitted here.

On entry button member 62, an array of entry protrusions 62A are formed, each of which penetrates outwardly through a corresponding hole 61A perforated in outer housing 61. Each person of protrusions 62A corresponds to the position of each switch element of membrane switch 38. As a user's finger horizontally slides on the face of protrusions 62A one after another, the bottom entry button member 62 depresses a specified position of the touch panel switch continuously. That is, a staircase-shaped signal is obtained from the touch panel switch. Such a signal is easy to recognize without amplification. It is therefore possible that the moving direction by the finger-sliding operation is easily detected and controlled with high reliability.

The structure promises an easy-to-view wide display 33 capable of displaying more information, and enhances a detecting accuracy of moving direction and speed during the finger-sliding operation.

In addition, as described in the first period embodiment, the touch panel switch 37 and entry button member 62 may be made of a transparent material, and an illuminator may be employed to light up the top of entry protrusions 62A. With the help of the structure, as is the case in the first preferred embodiment, the user can easily recognize the protrusions 62A in the dark.

In each of the first and second embodiments, the membrane switch 38 is activated without displacement of the touch panel switch 37 towards the membrane switch 38.

Third Preferred Embodiment

Figure 10:
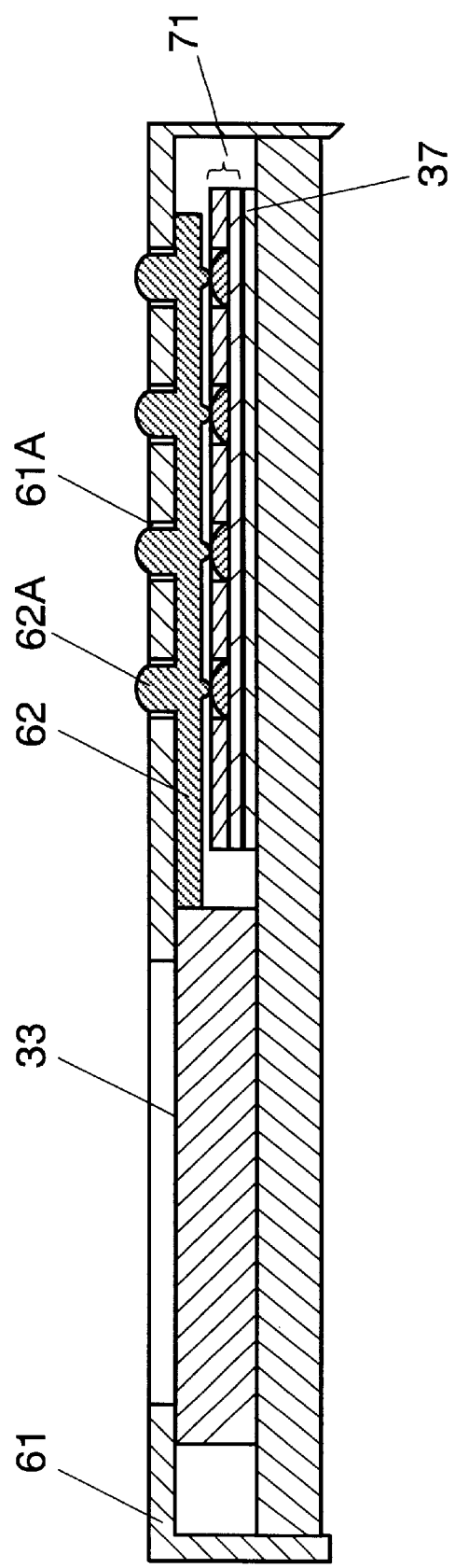
FIG. 10 shows a side cross-sectional view of a mobile phone in accordance with a third preferred embodiment of the present invention.
Figure 11:
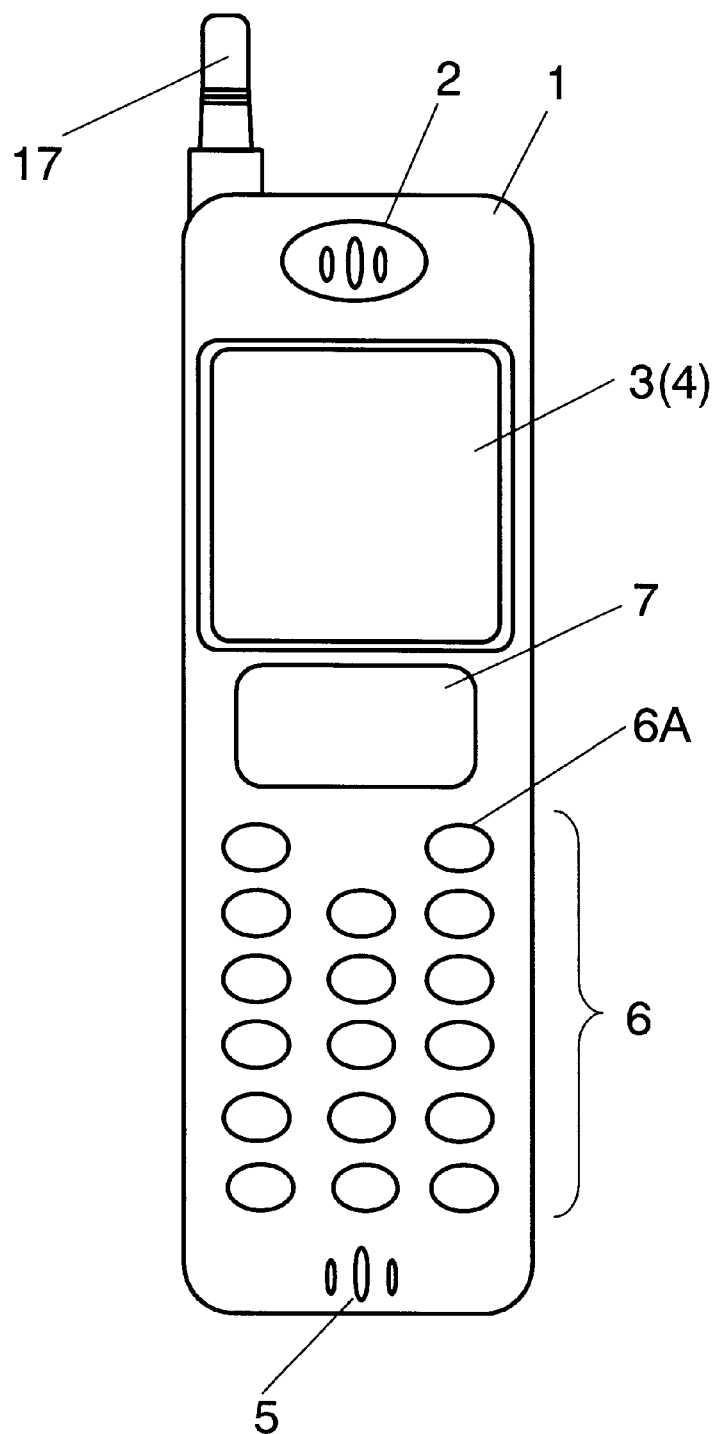
FIG. 11 shows a front view of a conventional mobile phone.
Figure 12:
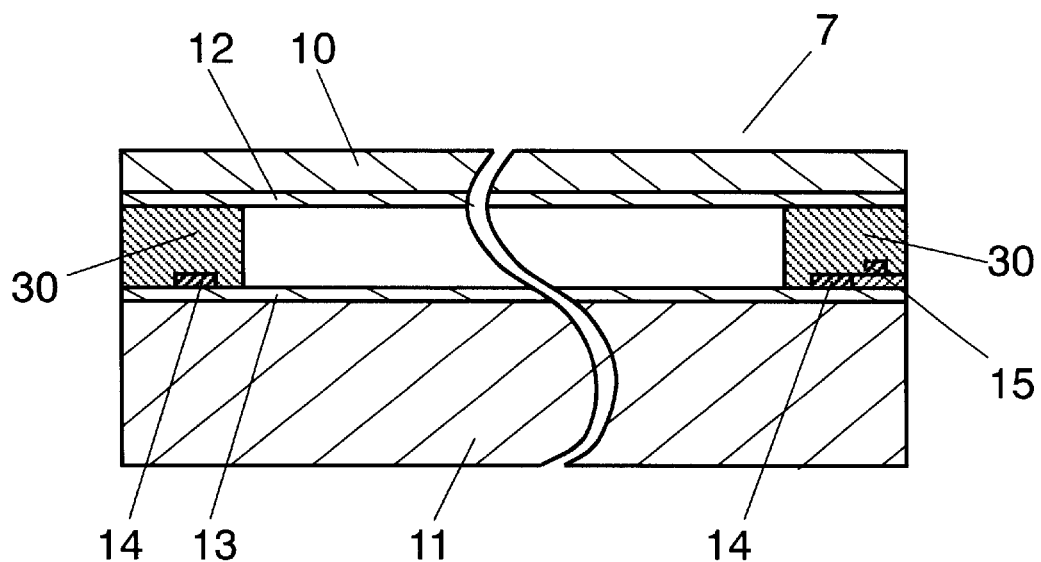
FIG. 12 shows a cross-sectional view of a touch panel switch, which is an essential part of the conventional mobile phone.
Figure 13:
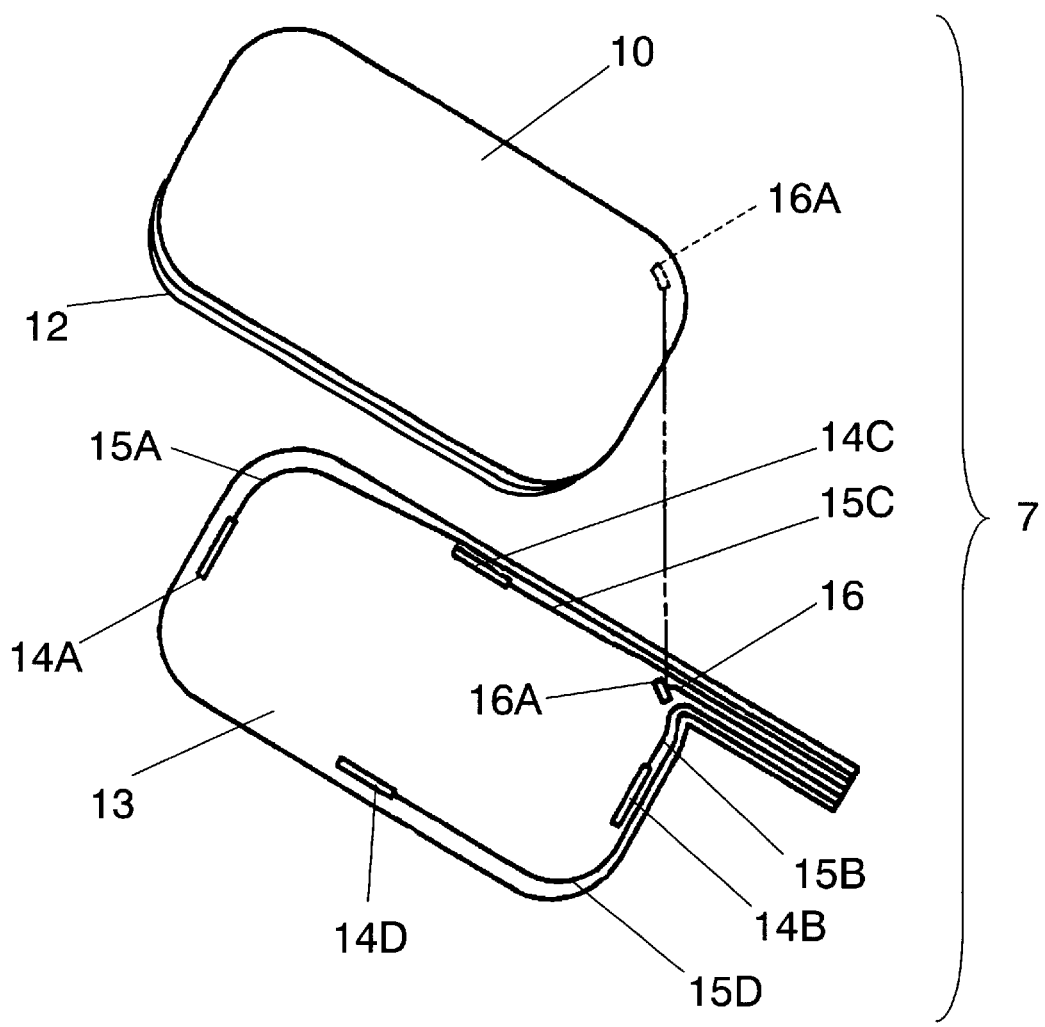
FIG. 13 shows an exploded perspective view of the touch panel switch, which is essential part of the conventional mobile phone.
Figure 14:
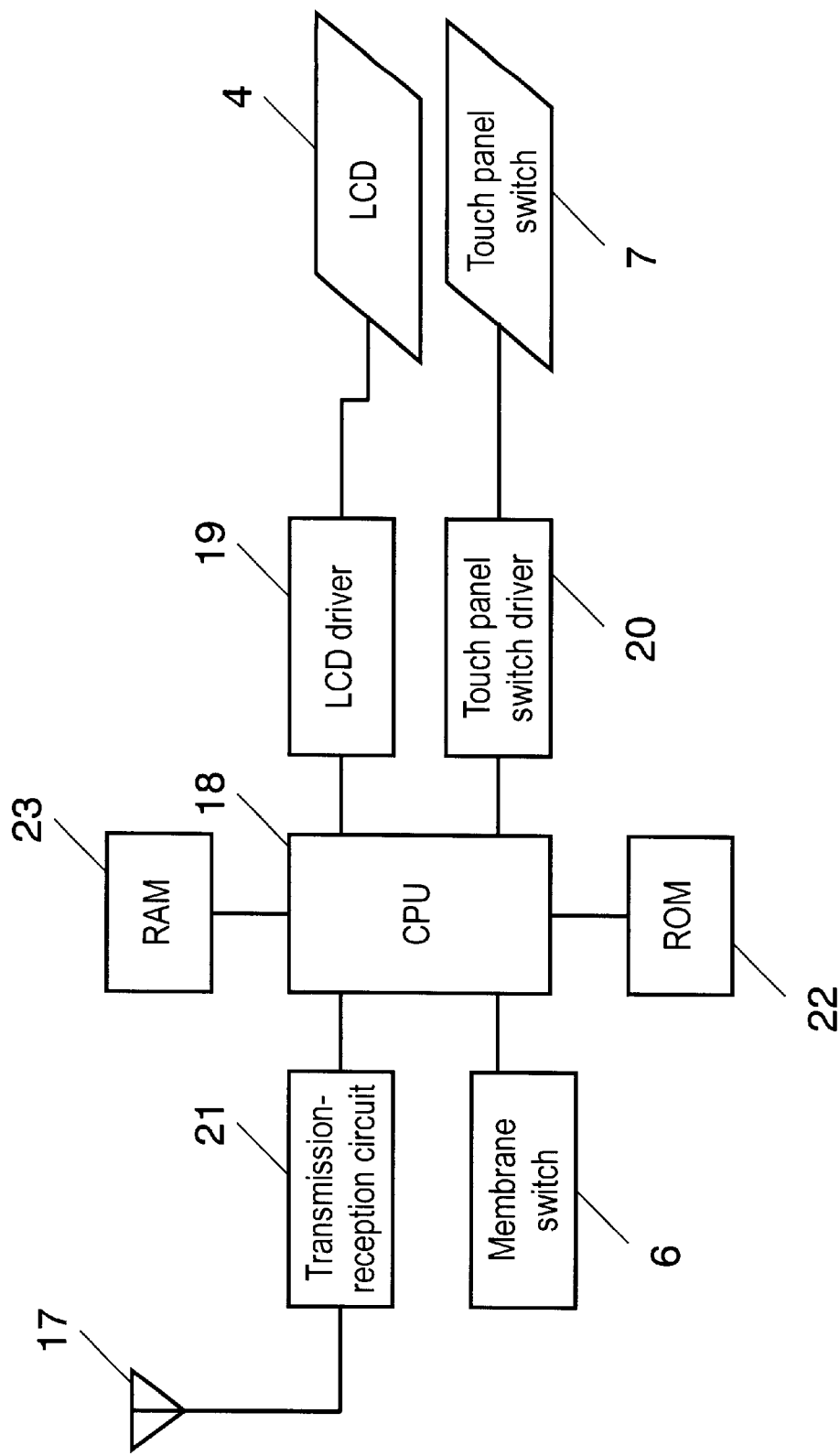
FIG. 14 shows a block diagram of the conventional mobile phone.
Figure 15:
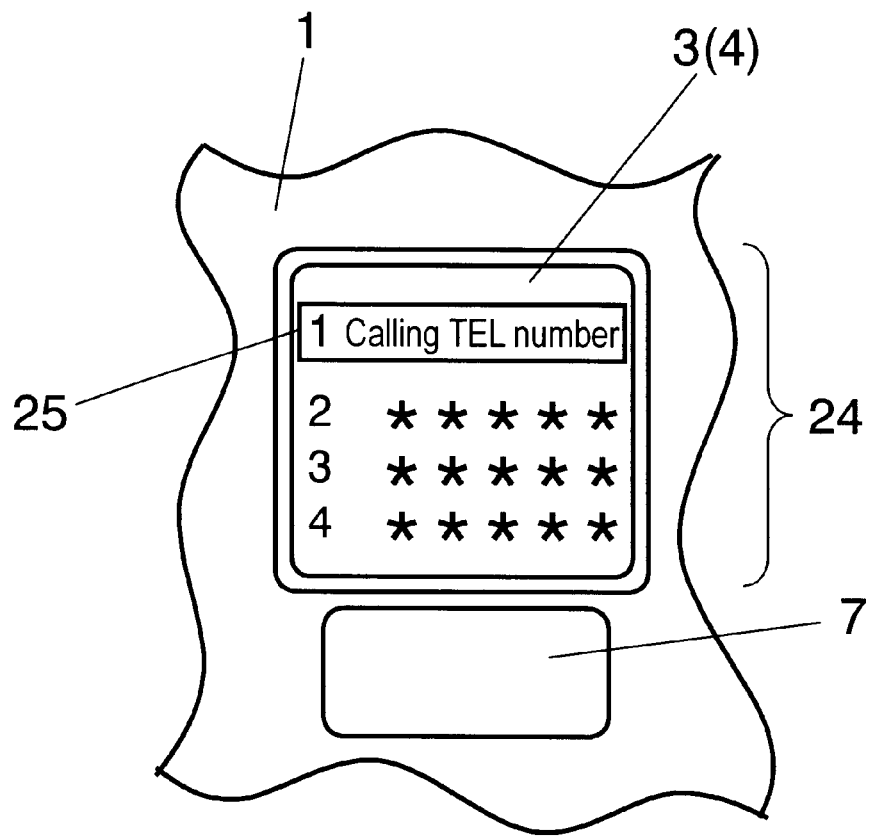
FIG. 15 shows a front view of the periphery of the display section of the conventional mobile phone before operation.
Figure 16:
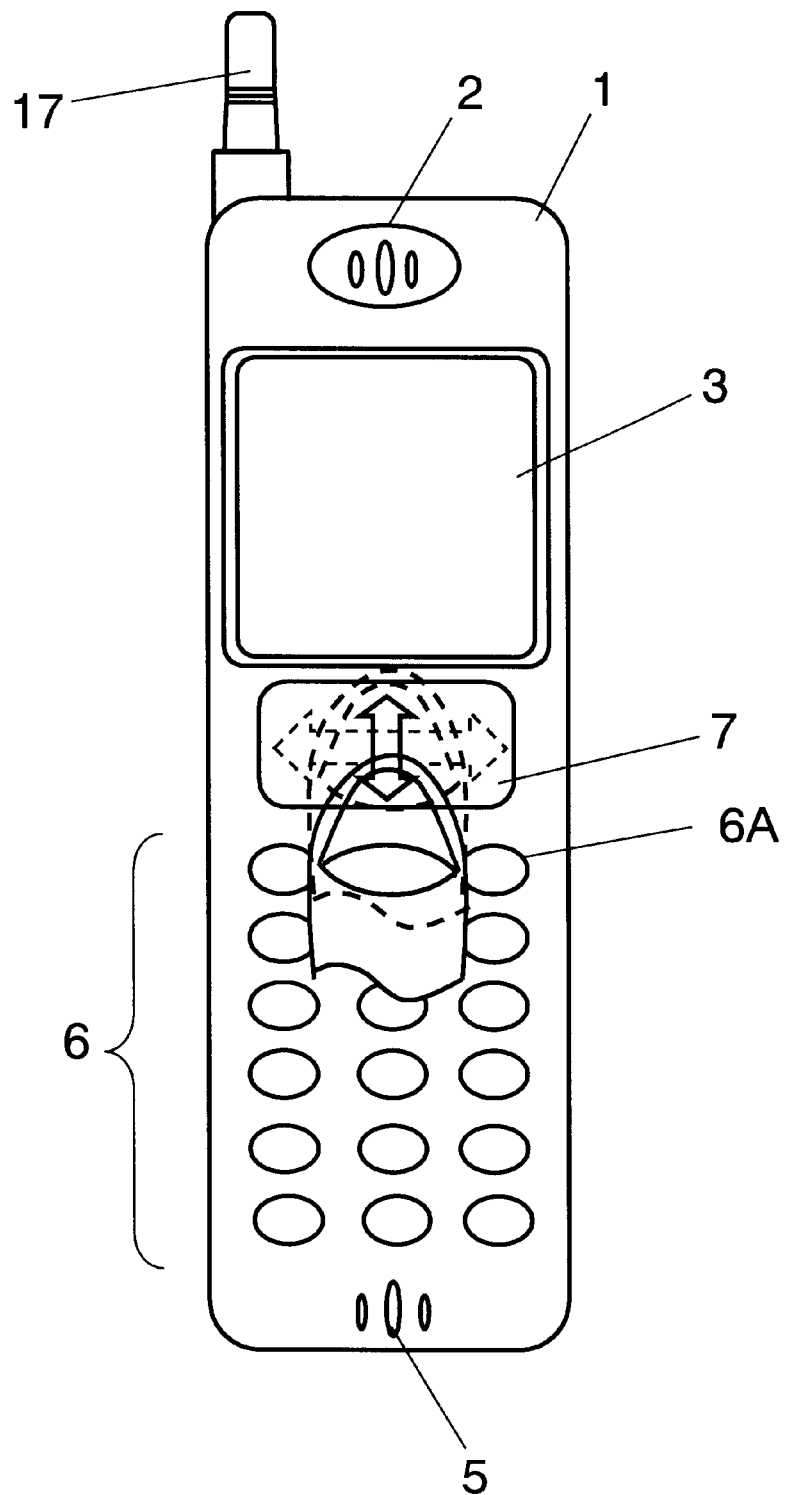
FIG. 16 shows a front view of the display section of the conventional mobile phone during operation.

FIG. 10 is a cross-sectional view of a mobile phone in accordance with a third preferred embodiment of the present invention. It is apparent from FIG. 10 that in the structure of this embodiment the position of the membrane switch is interchanged with the touch panel switch as shown the second preferred embodiment. That is, as shown in FIG. 10, elastic membrane switch 71 is laid over touch panel switch 37. Entry button member 62, which has an array of entry protrusions 62A thereon, is inserted between membrane switch 71 and outer housing 61. Each of protrusions 62A is disposed at a position that corresponds to each switch element of membrane switch 71. Each of protrusions 62A, as is the case of the second preferred embodiment, protrudes outwardly through a corresponding hole 61A perforated in outer housing 61.

In the third embodiment, when a user depresses any of protrusions 62A, the depression force activates the corresponding switch element of underlying membrane switch 71. On the other hand, when the user slides the finger horizontally on the face of some protrusions 62A, membrane switch 71 can apply a depression force, due to its elasticity, to a series of contact points on touch panel switch 37. Following the wake of the finger-sliding operation, the contact point changes its position on touch panel switch 37. As a result, an output signal corresponding to the positional changes is obtained from touch panel switch 37.

In response to the depression force applied to protrusions 62A, touch panel switch 37 also produces an output signal. As is the case of the first preferred embodiment, for avoiding a malfunction, it is preferable to employ a software-controlled evaluation such that any output signal from switch 37 is ignored when membrane switch 71 produces an output signal.

A wide space for display 33 is promised, similar to the case of the first preferred embodiment. As another advantage, entry button member 62 not only ensures a positive depression onto membrane switch 71, but also provides the user with a clicking tactile response with ease of use.

It is possible to configure the entry section without entry button member 62. In the case, membrane switch 71 is placed in exposed arrangement on outer housing 61. This configuration is also effective, as is the case described above.

In this embodiment, the touch panel switch 37 is activated without displacement of the membrane switch 71 toward the touch panel switch 37.

The present invention, as described in the embodiments, eliminates a space exclusive to a touch panel switch and, configures the touch panel switch and a depression switch with tactile feedback in a two-layered structure. A wide display area can thus be allocated at the entry section. Besides, the two-layered structure realizes an easy and quick selection with reliability by the finger-sliding/depressing operation on the wide touch panel surface. Employing the structure provides an electronic apparatus with greatly improved operability.

What is claimed is:

1. An electronic apparatus comprising:
    a display unit to display plural items and indicate which of the plural items is selected;
    a depression switch exhibit tactile feedback and having plural switch elements; and
    an elastic touch panel switch positioned over said depression switch,
    wherein said elastic touch panel switch and said depression switch are constructed and arranged to be activated without operating a user selection switch, such that
        (i) when a surface of said elastic touch panel switch is manipulated with a first force having a sliding component and a depression component, a moving direction and a moving amount of the sliding component of the first force are determined in response to changes of an output signal produced by said elastic touch panel switch, whereby one of the plural items that corresponds to the moving direction and moving amount is selected from among the plural items when displayed by said display unit, and
        (ii) when the surface of said elastic touch panel switch is manipulated with a depression force that is greater than the depression component of the first force, said elastic touch panel switch activates one of said plural switch elements at a position corresponding to a location of the surface of said elastic touch panel switch to which the depression force is applied by manipulating the surface of said elastic touch panel switch with the depression force, whereby the selected one of the plural items is entered into the electronic apparatus.

2. The electronic apparatus according to claim 1, wherein said plural switch elements are constructed and arranged such that when the surface of said elastic touch panel switch is manipulated with the depression force said elastic touch panel switch activates said one of said plural switch elements with tactile feedback.

3. The electronic apparatus according to claim 2, wherein said depression switch comprises a membrane switch.

4. The electronic approaches according to claim 3, further comprising an outer housing positioned over said elastic touch panel switch, and plural entry buttons positioned between said elastic touch panel switch and said outer housing.

5. The electronic apparatus according to claim 4, wherein said elastic touch panel switch and said plural entry buttons are transparent, and further comprising an illuminator positioned beneath said elastic touch panel switch.

6. The electronic apparatus according to claim 3, wherein said elastic touch panel switch is transparent, and further comprising an illuminator positioned beneath said elastic touch panel switch.

7. The electronic apparatus according to claim 2, further comprising an outer housing positioned over said elastic touch panel switch, and plural entry buttons positioned between said elastic touch panel switch and said outer housing.

8. The electronic apparatus according to claim 7, wherein said elastic touch panel switch and said plural entry buttons are transparent, and further comprising an illuminator positioned beneath said elastic touch panel switch.

9. The electronic apparatus according to claim 2, wherein said elastic touch panel switch is transparent, and further comprising an illuminator positioned beneath said elastic touch panel switch.

10. The electronic apparatus according to claim 1, wherein said depression switch comprises a membrane switch.

11. The electronic apparatus according to claim 10, further comprising an outer housing positioned over said elastic touch panel switch, and plural entry buttons positioned between said elastic touch panel switch and said outer housing.

12. The electronic apparatus according to claim 11, wherein said elastic touch panel switch and said plural entry buttons are transparent, and further comprising an illuminator positioned beneath said elastic touch panel switch.

13. The electronic apparatus according to claim 10, wherein said elastic touch panel switch is transparent, and further comprising an illuminator positioned beneath said elastic touch panel switch.

14. The electronic apparatus according to claim 1, further comprising an outer housing positioned over said elastic touch panel switch, and plural entry buttons positioned between said elastic touch panel switch and said outer housing.

15. The electronic apparatus according to claim 14, wherein said elastic touch panel switch and said plural entry buttons are transparent, and further comprising an illuminator positioned beneath said elastic touch panel switch.

16. The electronic apparatus according to claim 1, wherein said elastic touch panel switch is transparent, and further comprising an illuminator positioned beneath said elastic touch panel switch.

17. The electronic apparatus according to claim 1, wherein said elastic touch panel switch and said depression switch are constructed and arranged such that when the surface of said elastic touch panel switch is manipulated with the depression force, said elastic touch panel switch activates the one of said plural switch elements without displacement of said elastic touch panel switch towards depression switch.

18. An electronic apparatus comprising:
a display unit to display plural items and indicate which of the plural items is selected;
an elastic membrane switch exhibiting tactile feedback and having plural switch elements; and
a touch panel switch positioned beneath said elastic membrane switch,
wherein said touch panel switch and said elastic membrane switch are constructed and arranged to be activated without operating a user selection switch, such that
(i) when a surface of said elastic membrane switch is manipulated with a first force having a sliding component and a depression component, a moving direction and a moving amount of the sliding component of the first force are determined in response to changes of an output signal produced by said touch panel switch, whereby one of the plural items that corresponds to the moving direction and moving amount is selected from among the plural items when displayed by said display unit, and
(ii) when the surface of said elastic membrane switch is manipulated with a depression force that is greater than the depression component of the first force, one of said plural switch elements is activated at a position corresponding to a location of the surface of said elastic membrane switch to which the depression force is applied by manipulating the surface of said elastic membrane switch with the depression force, whereby the selected one of the plural items is entered into the electronic apparatus.

19. The electronic apparatus according to claim 18, further comprising an outer housing positioned over said elastic membrane switch, and plural entry buttons positioned between said elastic membrane switch and said outer housing.

20. The electronic apparatus according to claim 18, wherein said touch panel switch and said elastic membrane switch are constructed and arranged such that when the surface of said elastic membrane switch is manipulated with the depression force, the one of said plural switch elements is activated without displacement of said elastic membrane switch towards said touch panel switch.

* * * * *

UNITED STATES PATENT AND TRADEMARK OFFICE
CERTIFICATE OF CORRECTION

PATENT NO. : 6,518,958 B1
DATED : February 11, 2003
INVENTOR(S) : Akio Miyajima et al.

It is certified that error appears in the above-identified patent and that said Letters Patent is hereby corrected as shown below:

<u>Title page,</u>
Item [57], ABSTRACT,
Line 2, change "entirety" to -- entry --.
Lines 3, 8 and 12, change "The" to -- This --.

<u>Column 10,</u>
Line 22, change "exhibit" to -- exhibiting --.

Signed and Sealed this

Eighteenth Day of November, 2003

JAMES E. ROGAN
*Director of the United States Patent and Trademark Office*